United States Patent [19]

Okita et al.

[11] Patent Number: 4,812,351

[45] Date of Patent: Mar. 14, 1989

[54] MAGNETIC RECORDING MEDIUM

[75] Inventors: Tsutomu Okita; Masashi Aonuma; Hiroshi Hashimoto, all of Kanagawa, Japan

[73] Assignee: Fuji Photo Film Co., Ltd., Kanagawa, Japan

[21] Appl. No.: 191,804

[22] Filed: May 3, 1988

Related U.S. Application Data

[63] Continuation of Ser. No. 71,595, Jul. 9, 1987, abandoned, which is a continuation of Ser. No. 802,234, Nov. 27, 1985, abandoned.

[51] Int. Cl.$^4$ .................................. G11B 5/70
[52] U.S. Cl. ................................ 428/141; 427/44; 427/131; 428/336; 428/694; 428/900
[58] Field of Search .............. 428/141, 323, 694, 900; 427/44, 131

[56] References Cited

U.S. PATENT DOCUMENTS

| | | | |
|---|---|---|---|
| 4,337,288 | 6/1982 | Takenaka et al. | 428/694 |
| 4,474,843 | 10/1984 | Miyoshi et al. | 427/131 |
| 4,481,231 | 11/1984 | Hashimoto et al. | 427/44 |
| 4,496,626 | 1/1985 | Kasuga et al. | 428/900 |
| 4,560,616 | 12/1985 | Okita et al. | 427/44 |
| 4,592,942 | 6/1986 | Nishimatsu et al. | 427/131 |

*Primary Examiner*—Paul J. Thibodeau
*Attorney, Agent, or Firm*—Sughrue, Mion, Zinn, Macpeak and Seas

[57] ABSTRACT

A magnetic recording medium is described, comprising a non-magnetic support having a surface roughness of 0.02 μm or less, a magnetic layer on the surface of the support and a backing layer on a surface of the support opposite to the surface on which the magnetic layer is formed, wherein the backing layer is formed by exposing to radiation a layer comprising (A) non-magnetic particles and (B) a radiation polymerizable compound.

12 Claims, No Drawings

MAGNETIC RECORDING MEDIUM

This is a continuation of application Ser. No. 71,595 field July 9, 1987 now abandoned which is a continuation of application Ser. No. 802,234 filed Nov. 27, 1985, now abandoned.

FIELD OF THE INVENTION

The present invention relates to a magnetic recording medium having reduced dropouts, excellent electric properties and excellent wear resistance.

BACKGROUND OF THE INVENTION

A coated type magnetic recording medium which is prepared by dispersing ferromagnetic particles such as ferromagnetic iron oxide particles, ferromagnetic chrome dioxide particles or ferromagnetic alloy particles in an organic binder such as a copolymer of vinyl chloride and vinyl acetate, a copolymer of vinyl chloride and vinylidene chloride, a cellulose type resin, an acetal type resin, a urethane resin or an acrylonitrile and butadiene type resin to prepare a coating composition, coating it on a non-magnetic support and drying it has been widely used. A thin metal film type magnetic recording medium having a ferromagnetic thin metal film as a magnetic recording lyaer, which is formed by a vapor deposition method such as vacuum evaporation method, a sputtering method or an ion plating method, has drawn attention with the recent increased demand for high density recordings. It is necessary in both coated type magnetic recording media and thin metal film type magnetic recording media that good contact between a magnetic layer and a magnetic head is provided, so that electromagnetic conversion properties are improved; therefore, in general, a smooth magnetic layer is desirable.

If a magnetic layer is excessively smooth, running properties thereof in a video tape recorder deteroriates. Consequently, running properties of backing layers need to be improved.

Therefore, a method for providing a coated film (backing layer) comprised of particles of inorganic pigment and thermoplastics resin on a back surface of a support is disclosed in Japanese Patent Publication No. 34324/79. However, in this method there is a disadvantage that a backing layer comprised of only thermoplastic resins is easily scratched and thus-scratched powders increase dropouts.

It is disclosed in Japanese Patent Application (OPI) No. 144604/76 (the term "OPI" as used herein refers to a "published unexamined Japanese patent application") that a thermoplastic resin and a trifunctional isocyanate compound are used as a binder for a backing layer in order to improve scratch resistance. However, this method is also economically disadvantageous because a long period of time for heat hardening the binder is necessary. There is also another disadvantage that when a hardening treatment is conducted, the magnetic recording medium is then wound onto a roll, whereby the rough surface of the backing layer is transferred to the magneti layer, thereby increasing the surface roughness of the magnetic layer, and deteriorating electromagnetic properties.

To overcome these disadvantages, it is disclosed in Japanese Patent Application (OPI) Nos. 40755/82 and 3132/83 and U.S. Pat. No. 4,419,406 that a backing layer can be hardened by radiation exposure.

However, the above techniques are not entirely satisfactory, because there is no consideration therein with respect to the support itself. That is, surface smoothness on a surface of a magnetic layer is deteriorated, whereby electromagnetic conversion properties of the magnetic layer are deteriorated. Additionally, as scratch resistance of a backing layer is insufficient, so that the backing layer is easily scratched, and therefore dropouts increase after repeated running of a tape.

SUMMARY OF THE INVENTION

The objects of the present invention include solving the problems of (1) dropouts, (2) surface roughness of a magnetic layer deteriorating electromagnetic conversion properties, (3) the long period of time is necessary for hardening treatment, and (4) deterioration of running properties to thereby decrease electromagnetic conversion properties.

As a result of extensive studies done by inventors of the present invention, it was found that the above objects can be attained by a magnetic recording medium comprising a non-magnetic support having a surface roughness of 0.02 $\mu$m or less, and having a magnetic layer on one surface of the support and a backing layer on a surface of the support opposite to the surface on which the magnetic layer is formed, wherein the backing layer is formed by exposing to radiation a layer comprising (A) non-magnetic particles, and (B) a radiation polymerizable compound.

Thus, in accordance with the present invention, a backing layer having excellent running properties and durability can be realized, and a magnetic recording medium wherein surface roughness of a backing layer is not transferred to the surface of a magnetic layer, thereby not deteriorating electromagnetic properties of the magnetic layer, is provided.

DETAILED DESCRIPTION OF THE INVENTION

It is more preferred that the backing layer of the present invention is provided on a magnetic recording medium having a magnetic layer which is obtained by electron irradiating a layer containing an electron beam polymerizable compound and ferromagnetic particles. Methods for preparing a magnetic recording medium include (1) a method of coating a magnetic recording layer on a support having a backing layer exposed to electron beam irradiation beforehand and electron beam irradiating the magnetic layer, (2) a method which comprises coating a backing layer and a magnetic layer one after another, or simultaneously and polymerizing for hardening both the coated backing layer and the coated magnetic layer simultaneously by electron beam irradiation, and (3) a method which comprises coating a magnetic layer, polymerizing for hardening it by electron beam irradiatin and then polymerizing for hardening a coated backing layer by electron beam irradiation. Among these methods, a method of polymerizing for hardening both a coated backing layer and a coated magnetic layer simultaneously by electron beam irradiating is most preferred, because the energy efficiency for the hardening reaction is high.

Electromagnetic conversion properties can be remarkably improved by using a backing layer of the present invention which can be applied both to a heat hardening coated type magnetic recording medium and to a thin metal film type magnetic recording medium.

Non-magnetic fine particles used in the present invention include carbon black, graphite, zinc oxide, titanium oxide, barium sulfate, talc, kaolin, chromium oxide, red iron oxide ($\alpha$-$Fe_2O_3$), cadmium sulfide, goethite, silica aerogel, alumina anhydride, fine particles of calcium carbonate, molybdenum disulfide, and carbon fluoride. An average particle size of the particels is preferably 0.8 $\mu$m or less, and more preferably from 0.03 to 0.4 $\mu$m.

Radiation polymerizable compounds which can be used in the present invention include compounds containing at least two groups selected from acryloyl groups, vinyl ether groups, and allyl groups in a molecule and having a molecular weight of from 500 to 100,000, preferably from 3,000 to 50,000, and more preferably from 5,000 to 30,000. Examples of these compounds are described in A. Vrancken, *Fatipec Congress*, Vol. 11, p. 19 (1972). An exmaple is the compound having the formula

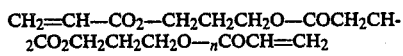

$$CH_2=CH-CO_2-CH_2CH_2CH_2O-COCH_2CH-_2CO_2CH_2CH_2CH_2O-_nCOCH=CH_2$$

wherein n is a positive integer of from 3 to 600 preferably from 20 to 300, and more preferably from 30 to 200. In the above compound, the polyester skeleton may be a polyurethane skeleton, an epoxy resin skeleton, a polyether skeleton, a polycarbonate skeleton, or a mixture thereof. The terminal of the main chian in the compound may be methacryloyl group. Particularly preferred is a compound having a polyurethane skeleton having at least two acryloyl groups in a molecule and having a molecular weight of from 3,000 to 50,000. Furthermore, other radiation polymerizable compounds cna also be added to these radiation polymerizable compounds. These other radiation polymerizable compounds are monomers having carbon-carbon unsaturated bond. Examples of the monomers include acrylic acid, methacrylic acid, itaconic acid, alkyl acrylate such as methyl acrylate and a homolog thereof, alkyl methacrylate such as methyl methacrylate and a homolog thereof, styrenes, substituted styrenes such as $\alpha$-methyl styrene and $\beta$-chlorostyrene acrylonitrile, emthacrylonitrile, acrylamide, methacrylamide, vinyl acetate, vinyl propionate, N-vinylpyrrolidone and tetrahydrofuryl acrylate. Two or more carbon-carbon unstaturated bonds may be included in the monomer. Examples of these monomers are described in *Kankosei Jushi Detashu (Data Collection of Ligh-Sensitive Resins)*, pages 235–235, published in December, 1968 by Sogo Kagaku Kenkyusho Co., Ltd. Monomer examples having two or more carbon-carbon unsaturated bonds include acrylates and methacrylates thereof such as ethylene glycol diacrylate, diethylene glycol diacrylate, triethylene glycol diacrylate, tetraehtylene glycol diacrylate, trimethylolpropane triacylate, pentaerythritol triacylate, tetramethylolmethane tetraacrylate, dipentaerythritol pentaacrylate, dipentaerythritol hexaacrylate, tris($\beta$-acryloyloxyethyl)isocyanurate or bis($\beta$-acryloyloxyethyl)hydroxy ethylisocyanurate. If desired, thermoplastic resins can also be added as a binder. The binder referred herein contains the radiation polymerizable compound used according to the present invention, additional radiation polymerizable compounds, and thermoplastic resins. The thermoplastic resins, for example, include a polyvinyl chloride type copolymer such as a copolymer of vinyl chloride and vinyl acetate, a copolymer of vinyl chloride, vinyl acetate, and maleic acid, a copolymer of vinyl chloride, vinyl acetate, and vinyl alcohol, a copolymer of vinyl chloride, vinyl acetate, maleic acid, and vinyl alcohol, a copolymer of vinyl chloride, vinyl propionate, and vinyl maleate, a copolymer of vinyl chloride, vinyl propionate, and vinyl alcohol, a copolymer of vinylidene chloride, vinyl acetate, a maleic acid, a copolymer of vinylidene chloride, vinyl propionate, and vinyl alcohol, a copolymer of vinyl chloride, vinyl acetate, and acrylic acid, a copolymer of vinyl chloride, vinyl acetate, acrylic acid, and vinyl alcohol or a saponified copolymer thereof; a cellulose type resin such as cellulose dinitrate, cellulose acetate propionate, cellulose acetate butyrate, or cellulose diacetate; an acetal resin; a polyurethane resin containing a skeleton of the main chain such as polyester, polyether, polyester ether, or a lactone type polyester formed by $\gamma$-butyrolactone, $\delta$-volaerolactone or $\epsilon$-caprolactone; wherein a dibasic acid used in the polyurethane include oxalic acid, malonic acid, succinic acid, glutaric acid, adipic acid, sebacic acid, dedenoic diacid, maleic acid, fumaric acid, itaconic acid, trimethyladipic acid, hexahydrophthalic acid, tetrahydrophthalic acid, phthalic acid, isophthalic acid, terephthalic acid, or naphthalenedicarboxylic acid, a dihydric alcohol used in the polyurethane include ethylene glycol, trimethylene glycol, tetramethylene glycol, pentamethylene glycol, hexamethylene glycol, octamethylene glycol, diethylene glycol, triethylene glycol, tetraehtylene glycol, 2,2-diemthylpropane-1,3-diol, 2,2-diethylpropane-1,3-diol, cyclohexane-1,3-diol, cyclohexane-1,4-diol, cyclohexane-1,4-dimethanol, cyclohexane-1,3-dimethanol, 2,2-bis(4-hydroxyethoxycyclohexyl)propane, or 2,2-bis(4-hydroxyethoxyphenyl)-propane; a polysiocyante forming a urethane bond include 2,3-tolylenediisocyanate, 2,6-tolylenediisocyanate, 1,3-xylenediisocyanate, 1,4-xylenediisocyanate, 1,5-naphthalenediisocyanate, m-phenylenediisocyanate, p-phenylenediisocyanate, 3,3-dimethylphenylenediisocyanate, 4,4-diphenylmethanediisocyanate, 3,3-dimethyl-4,4-diphenylmethanediisocyanate, hexamethylenediisocyanate, isophoronediisocyanate, dicyclohexylmethanediisocyanate or adduct of 3 mol tolylenediisocyanate or timethylolpropane, and trivalent or more basic acid and alcohol which a part of the above described dibasic acid and dihydric alcohol, respectively was substituted; a copolymer of acrylonitrile and butadiene; and a copolymer of vinylidene chloride and vinyl chloride.

The weight ratio of non-magnetic particles to a binder is preferably from 4/1 to 0.1/1, and more preferably from 3/1 to 0.5/1. It is preferable that the radiation polymerizable compound in a binder is contained in an amount of 20 wt % or more, and more preferably 40 wt % or more, based on the total weight of the binder.

The expression "surface roughness" as used in the case of the present invention refers to the center line average roughness at a cut-off value of 0.25 mm, as defined in item 5 of JIS-B-0601. The surface roughness of the support which can be used in the present invention is 0.02 $\mu$m or less, preferably 0.015 $\mu$m or less, and more preferably 0.01 $\mu$m or less.

Materials for the support in the present invention include polyesters such as polyethylene terephthalate and polyethylene 2,6-naphthalate; polyolefins such as polyethylene and polypropylene; cellulose derivatives such as cellulose triacetate, cellulose diacetate, cellulose acetate butyrate and cellulose acetate propionate; vinyl polymers such as polyvinyl chloride and polyvinylidene chloride; and other polymers such as polycarbonates, polyimides and polyamidoimides. In addition, depending on the use of the magnetic recording medium, non-magnetic metals such as aluminum, copper, tin, and zinc, or non-magnetic alloys containing such metals; a plastic support vapor-deposited with a thin film of such non-magnetic metals by a vacuum evaporation method can be used.

A thickness of the non-magnetic support is preferably from about 1 to 30 μm, and more preferably from about 2 to 20 μm.

Furthermore, lubricating agents and dispersing agents described in U.S. Pat. Nos. 4,452,863 and 4,444,842, abrasive agents described in U.S. Pat. Nos. 4,367,261 and 4,474,843, anti-corrosive agents described in U.S. Pat. No. 4,202,927, and antistatic agents described in U.S. Pat. Nos. 4,310,599 and 3,881,046 can be added in the backing layer of the present invention. Particularly, lubricating agents includes saturated and unsaturated higher fatty acid, fatty acid ester, high fatty acid amide, higher alcohol, silicone oil, mineral oil, vegetable oil, animal oil, and fluoride compounds.

On preparing a coating composition for a backing layer, the above described compositions are introduced simultaneously or sequentially into a mixer. Various mixers can be used for mixing, kneading, and dispersing a coating composition, such as two roll mill, a three roll mill, a ball mill, a trommel, a sand grinder, a Szegvari Atritor, a high speed impeller dispersing device, a high-speed stone mill, a high-speed impact mill, disper, a kneader, a high speed mixer, a homogenizer, or an ultra-sonic dispersing device.

Techniques of mixing, kneading, and dispersing are described in T. C. Patton, *Paint Flow and Pigment Dispersion*, John Wiley & Sons (1964) and in U.S. Pat. Nos. 2,581,414 and 2,855,156.

Methods for coating a backing layer on a support include an air doctor coating method, a blade coating method, a doctor blade coating method, an air knife coating method, a coil bar coating method, a squeeze coating method, a dipping coating method, a reverse roll coating method, a transfer roll coating method, a gravure coating method, a kiss coating method, a cast coating method, a spray coating method, a spin coating method, and the like. The coating methods are disclosed in more detail in *Coating Kogaku* (*Coating Engineering*), pages 253–277, published by Asakura Shoten, on Mar. 20, 1971.

A backing layer may be provided before or after a magnetic layer is coated, or after a magnetic layer is dried. If a magnetic layer needs surface smoothing treatment, a backing layer can be provided after a magnetic layer is subjected to surface treatment. If a magnetic layer needs hardening treatment, a backing layer can be provided after a magnetic layer is subjected to hardening treatment. A dry thickness of the backing layer coated is generally from 0.05 to 210 μm, preferably from 0.1 to 5 μm, and more preferably from 0.1 to 1.0 μm.

The radiation which can be used in the present invention includes ultraviolet rays, electron beams, γ-rays, and X-rays. Among these, ultraviolet rays and electron beams having a low voltage are most preferred. When an ultraviolet ray is irradiated, it is preferred that a photopolymerization initiator such as benzoin ethyl ether or benzophenone Michler's ketone is added to the above described binder. A mercury lamp can be used as a light source for ultraviolet irradiation.

As the electron beam accelerator, a scanning method, a double scanning method, a curtain beam method or a broad beam curtain method can be employed. The curtain beam method and a broad beam curtain method are preferred, because a large output can be obtained relatively inexpensively. Regarding electron beam characteristics, the acclerating voltage is from 100 to 1,000 kv, preferably from 150 to 300 kv, and the absorption dose is from about 0.5 to 20 Mrad and preferably from 2 to 10 Mrad. If the accelerating voltage is les than 100 kv, the transmitted amount of energy is insufficinetly low. On the other hand, if it is in excess of 1,000 kv, the energy efficiency used for polymerization drops, which is undesirable from an economical standpoint. If the absorption dose is less than 0.5 Mrad, the hardening reaction proceeds only insufficiently, producing a magnetic layer having a low mechanical strength. On the other hand, if it is in excess of 20 Mrad, the energy efficiency used for hardening reaction drops, and the irradiated object generates heat, undesirably causing the deformation of, in particular, the plastic support.

The magnetic layer is provided on the above described support, e.g., by using a method described in U.S. Pat. Nos. 4,343,831, 4,518,656 and 4,468,436.

The present invention is further illustrated in more detail by the following examples. It will be easily understood by one skilled inthe art that materials, quantities and operation orders can be changed so long as the gist of the present invention is not essentially changed. Accordingly, the present invention is not limited to the following examples. Unless otherwise indicated, all parts, percents, and ratios in examples and comparative examples are by weight.

EXAMPLE 1

| Coating Solution for a Magnetic Layer A: | |
|---|---|
| | parts |
| γ-Fe$_2$O$_3$ [Hc (coercive force): 630 Oe, particle size: 0.4 × 0.05 × 0.05 μm] | 400 |
| Nitrocellulose ("NC RS1/2H", a trade name, manufactured by Daicel Chemical Industries, Ltd.) | 50 |
| Urethane acrylate (acrylate compound of a polyester polyurethane resin comprised of butane diol, adipic acid and tolylene diisocyanate, Mn 20,000) | 35 |
| Trimethylolpropane triacrylate | 15 |
| α-Al$_2$O$_3$ | 5 |
| Carbon black | 10 |
| Stearic acid | 4 |
| Butyl stearate | 4 |
| Methyl ethyl ketone | 1,000 |

The above ingredients were kneaded and dispersed in a ball mill for 20 hours.

| Coating Solution for a Backing Layer B: | |
|---|---|
| | parts |
| Carbon black (particle size: 0.1 μm) | 100 |
| Urethane acrylate oligomer ("M 1200", a trademark of product manufactured by Toagosei Chemical Industry Co., Ltd.) | 70 |
| Trimethylolpropane triacrylate | 30 |
| Methyl ethyl ketone | 500 |

The above ingredients were kneaded in a ball mill for 10 hours.

The coating solution A was coated by a doctor blade coating method on a 15 μm thick polyethylene terephthalate support having Ra value (surface roughness) of 0.014 μm in a dry thickness of 5 μm, which was then subjected to magnetic orietnation by a Co-magneto of 3,000 Gauss and dried. After drying the thus obtained magnetic layer, it was subjected to surface treatment using a super calender roll. On a surface of the support opposite to the magnetic layer, the coating solution B was coated by a coil bar coating method in a dry thickness of 1 μm and dried, and then the thus obtained backing layer is irradiated with an electron beam at an accelerating voltage of 165 kv, an absorption does of 10 Mrad, and a beam current of 15 mA. The thus obtained tape was identified as Sample No. 1.

In the following examples, the same procedure as in Example 1 was repeated to prepare Sample Nos. 2 to 5, except that Ra value (surface roughness) of the polyethylene terephthalate support having a thickness of 15 μm is changed. The results are shown in Table 1.

TABLE 1

| Example 2 | Ra value: 0.006 μm | Sample No. 2 |
| Example 3 | Ra value: 0.009 μm | Sample No. 3 |
| Example 4 | Ra value: 0.017 μm | Sample No. 4 |
| Comparative Example 1 | Ra value: 0.023 μm | Sample No. 5 |

COMPARATIVE EXAMPLE 2

The same procedure as in Example 1 was repeated to prepare Sample No. 6, except changing the coating solution B to the coating solution C as described below.

| Coating Solution for a Backing Layer C: | |
| --- | --- |
| | parts |
| Calcium carbonate (particle size: 0.2 μm) | 100 |
| Resin of vinyl chloride and vinyl acetate ("VAGH", a trademark of product manufactured by UC Co., Ltd.) | 100 |
| Methyl ethyl ketone | 500 |

COMPARATIVE EXAMPLE 3

The same procedure as that in Example 1 was repeated to prepare Sample No. 7 except that a coating solution D was used instead of a coating solution B and that a backing layer was provided after a magnetic layer was coated, subjected to calendering treatment and exposed to electron beam. Then, heat treatment at 60° C. was conducted for 48 hours.

| Coating Solution for a Backing Layer D: | |
| --- | --- |
| | parts |
| Carbon black (particle size: 0.1 μm) | 100 |
| Urethane resin ("N2304", a trademark of product manufactured by Nippon Polyurethane Co., Ltd.) | 80 |
| 3 adduct of trimethylolpropane and tolylene diisocyanate | 20 |
| Methyl ethyl ketone | 500 |

COMPARATIVE EXAMPLE 4

The same procedure as in Example 1 was repeated to prepare Sample No. 8 except that carbon black was removed from the coating solution B of Example 1.

Regarding these samples, tests and evaluation were made in the following manner.

1. Video S/N:

Gray signals at 50% set up were recorded using a video tape recorder "NV8200", a trade name, manufactured by Matsushita Electric Industires co., Ltd. and noise was measured by an S/N meter "Shibasoku 925C Type", a trademark of product manufactured by Shibasoku Co., Ltd. and is shown by a relative value with video S/N Sample No. 1 defined as 0 dB.

2. Dropout:

Increase of dropouts for 15 μsec or more was measured after repeated run for 100 passes of a tape used in "Video S/N test". The results are shown in Table 1.

TABLE 2

| Sample No. | Video S/N | Increase of Dropouts |
| --- | --- | --- |
| 1 (Invention) | ±0 dB | 10/min |
| 2 (Invention) | +1.5 dB | 12/min |
| 3 (Invention) | +0.6 dB | 11/min |
| 4 (Invention) | −0.2 dB | 15/min |
| 5 (Comparison) | −1.5 dB | 25/min |
| 6 (Comparison) | −0.9 dB | 40/min |
| 7 (Comparison) | −3.0 dB | 30/min |
| 8 (Comparison) | −2.0 dB | 28/min |

It is apparent from the above that the present invention has excellent electromagnetic conversion properties, as well as good durability and reduced dropouts.

While the invention has been described in detail and with reference to specific embodiemtns thereof, it will be apparent to one skilled in the art that various changes and moficiations can be made therein without departing from the spirit and scope thereof:

What is claimed is:

1. A magnetic recording medium comprising a non-magnetic support with opposing surfaces carrying a magnetic layer and backing layer both having a surface roughness of 0.02 μm or less, the magneti layer on one surface of the support, and the backing layer being on the surface of the support opposite to the surface on which the magnetic layer is formed, wherein the backing layer is formed by exposing to radiation a layer comprising (A) non-magnetic particles having an average particle size of 0.8 μm or less and (B) a binder comprising a radiation exposed radiation polymerizable compound wherein the weight ratio of non-magnetic particles to the binder is from 4/1 to 0.01/1 and wherein the radiaton polymerizable compound is used in an amount of 20 wt % or more based on the total weight of the binder wherein said magnetic layer is coated on the non-magnetic support and, dried, and then subjected to surface smoothin by calendering, whereafter the backing layer is coated and then the resulting assembly is subjected to said exposing the radiation to thereby obtain said magnetic recording medium.

2. A magnetic recording medium as in claim 1, wherein the radiation polymerizable compound is a compound having a polyurethane skeleton, having at least two acryloyl groups in a molecule, and having a molecular weight of from 3,000 to 50,000.

3. A magnetic recording medium as in claim 1, wherein the surface roughness of the non-magnetic support is 0.015 μm or less;

4. A magnetic recording medium as in claim 1, wherein the magnetic layer has been prepared by electron irradiatioan of a layer containing an electron beam polymerizable compound as a binder and ferromagnetic particles.

5. A magnetic recording medium as in claim 7, wherein the electron beam irradiation has been carried out so as to simultaneously polymerize and harden the magnetic layer and the backing layer.

6. A magnetic recording medium as in claim 1, wherein the average particle size of the non-magnetic particles is from 0.03 to 0.4 $\mu$m.

7. A magnetic recording medium as in claim 2, wherein the radiation polymerizable compound has a molecular weight of from 5,000 to 30,000.

8. A magnetic recording medium as in claim 1, wherein the weight ratio of non-magnetic particles to a binder is from 3/1 to 0.5/1.

9. A magnetic recording medium as in claim 1, wherein the radiation polymerizable compound is used in an amount of 40 wt % or more, based on the total weight of the binder.

10. A magnetic recording medium as in claim 1, wherein the surface roughness of the non-magnetic support is 0.01 $\mu$m or less.

11. A magnetic recording medium as in claim 1, wherein the thickness of the non-magnetic support is from 1 to 30 $\mu$m.

12. A magnetic recording medium as in claim 1, wherein the thickness of the non-magnetic support is from 2 to 20 $\mu$m.

* * * * *